United States Patent [19]

Obrestad

[11] Patent Number: 5,205,930
[45] Date of Patent: Apr. 27, 1993

[54] SCREW PRESS FOR SEPARATING MANURE INTO WET AND DRY PHASES

[75] Inventor: Harald Obrestad, Naerbo, Norway

[73] Assignee: Reime A/S, Norway

[21] Appl. No.: 925,515

[22] Filed: Aug. 5, 1992

Related U.S. Application Data

[63] Continuation of Ser. No. 679,887, Apr. 3, 1991, abandoned.

[51] Int. Cl.$^5$ ............................................. B01D 29/64
[52] U.S. Cl. ................................... 210/251; 210/414; 210/415; 100/117; 100/145
[58] Field of Search .............. 210/251, 415, 770, 414; 100/37, 117, 126, 127, 145; 119/28

[56] References Cited

U.S. PATENT DOCUMENTS

| | | | |
|---|---|---|---|
| 3,188,942 | 6/1965 | Wandel | 100/72 |
| 3,966,607 | 6/1976 | Gaynor et al. | 210/137 |
| 5,009,795 | 4/1991 | Eichler | 100/117 |

FOREIGN PATENT DOCUMENTS

| | | | |
|---|---|---|---|
| 367037 | 5/1990 | European Pat. Off. | |
| 2620628 | 3/1977 | Fed. Rep. of Germany | 100/117 |
| 3122131 | 12/1982 | Fed. Rep. of Germany | |
| 61559 | 5/1955 | France | |
| 2341366 | 9/1977 | France | 119/28 |
| 867662 | 10/1981 | U.S.S.R. | 100/117 |
| 133673 | 11/1968 | United Kingdom | 100/117 |

*Primary Examiner*—Matthew O. Savage
*Attorney, Agent, or Firm*—Andrus, Sceales, Starke & Sawall

[57] ABSTRACT

A device for separating manure into wet and dry phases is disclosed herein. The manure separator includes a cylindrical strainer portion, a jacket disposed around the strainer portion to collect the wet phase, and a rotatable screw conveyor disposed within the strainer portion. The rotatable screw conveyor includes a shaft, and first and second screw thread sections disposed on the shaft and spaced from one another to include a longitudinal, annular zone that is free of obstruction around the entire circumference of the shaft. The longitudinal, annular zone causes a plug of relatively dry manure to form therein, the forming of which exerts back pressure on upstream portions of manure adjacent the first screw thread section enhancing the separation. The second screw thread section removes downstream portions of the plug for discharge of the dry phase from the device.

4 Claims, 1 Drawing Sheet

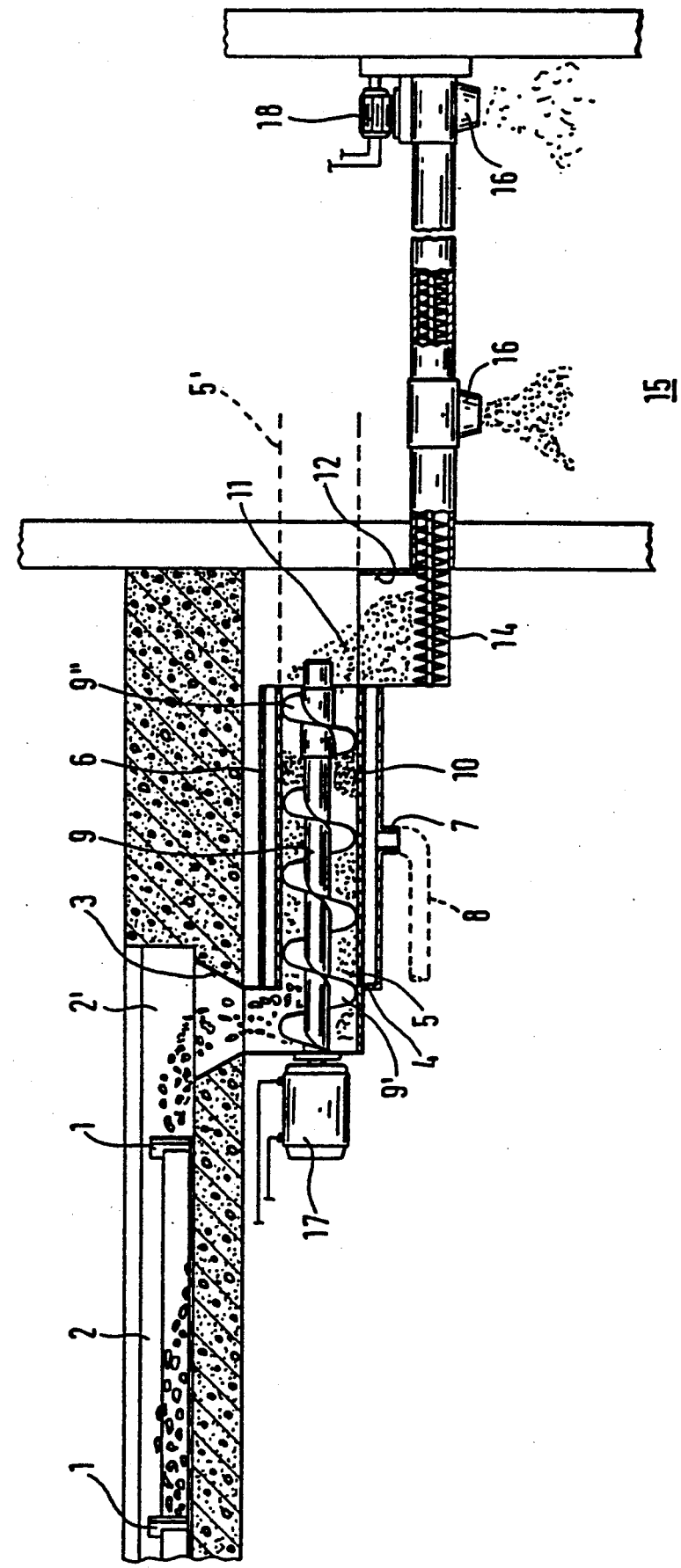

SCREW PRESS FOR SEPARATING MANURE INTO WET AND DRY PHASES

The present application is a continuation application of U.S. patent application Ser. No. 07/679,887, filed Apr. 3, 1991 and now abandoned.

The present invention relates to a method and a device for the mechanical separation of natural manure masses into a wet phase and a dry phase for individual applications.

Generally, natural manure or manure from domestic animals is separated into a wet phase and a dry phase in order to obtain manurial matter easier to handle.

If the manure is separated in such a degree that the dry phase contains at least 20 percent by weight of dry substance, the dry manurial matter will be self-composting, i.e. capable of being plowed down and act as a soil-improving agent, without any risk of polluting the surroundings. From a separator, such a dry manure may be conveyed to a conventional manure cellar for storage.

The wet phase of the manure, the wet manure, would be strained through the strainer device of the separator, wherein the holes incorporated into the perforation of the cylindrical mantle of the strainer device may have a diameter of e.g. 3 mm. Such a wet manure is easily pumpable and may, possibly, be diluted with water, in order to be used as a liquid manurial matter for meadows. Also, such a diluted wet manure may be pumped onto a meadow by means of ordinary watering plants.

Today, manure from domestic animals containing wet as well as dry manure is collected in a large tank/room. In order to satisfy the manure-accomodating capacity of a middling large farm, the tank/room must have a substantial volume. From the tank/room, the manure from domestic animals is pumped to a manure separator effecting the separation into wet and dry phases.

Known methods and devices for the separation of natural manure are laborious. Thus, it would be advantageously to be capable of effecting the separation in the immediate association to a central scraper plant for manure from domestic animals, and thereby avoid the intermediate working operations of conveying the manure to said large tank/room and therefrom to the separator. Also, there is a need for a manure separator which by way of simple means would be capable of effecting the necessary separation into wet and dry phases. Especially, there is a need for a manure separator wherein a forced dewatering may be effected in a simple manner during the separation process.

The method and the device according to the invention are characterized through the features defined in the following claims.

Such a method and such a device, respectively, may easily be adapted for use in direct association to a central scraper plant for manure from domestic animals.

In the separation method according to the invention, at a certain location of the feeding path of the manure, a manure plug forming station or zone is established, wherein the manure masses are subjected to minimum external influence and, thus, be given the opportunity of building themselves up, forming a relatively dry plug. Such a plug will form a barrier against liquid manure components and provide for a sufficient counter pressure to press liquid manure out through the perforation holes in the cylindrical mantle surrounding the feeding means for the manure. Thereby, a forced dewatering of the mass is achieved, favouring the separation effect.

Practical experiments have shown that such a manure plug will have a liquid content as low as 60-70 percent by weight, i.e. a dry substance content of 30-40 percent by weight. The plug consists of a loosely packed resilient mass. "Dry" mass must be removed continuously from the plug which, in its turn, is continuously added new matter and, thus, maintains the thickness thereof during the entire separation process. Mass is removed from the downstream end of the plug by scraping or the like.

As a feeding means for the manure from domestic animals, it is suitable to use a screw conveyor concentrically surrounded by a perforated cylinder mantle. By removing a portion of the screw thread over a certain length of the screw, said plug-forming station is established, the screw thread downstream of the plug thereby acting as scraper means for the manure plug and as means for the further transport of dry mass from the plug, i.e. dry manure which therefrom may be conveyed directly to a manure cellar or the like.

The perforated cylinder mantle surrounding the screw conveyor is, in its turn, surrounded by a non-perforated cylinder mantle which, at the bottom portion thereof, is provided with a discharge socket for liquid manure, wet manure, which is transported to a suitable storage in a manner known per se.

Further objects, features and advantages of the present invention will appear from the following description in connection with an example of a preferred embodiment diagrammatically illustrated in the enclosed drawing, wherein the single figure shows a vertical section through a manure separation device in accordance with the invention, arranged in immediate association to a central scraper plant for manure from domestic animals.

The separation device for manure from domestic animals as shown in the figure of the drawing, is arranged in direct association to a central scraper plant, shown diagrammatically only, the pivotable carriers thereof being denoted with the reference numeral 1; 2 indicating a manure chute wherein the scraper plant has been placed.

At the downstream end 2' thereof, the manure chute 2 ends in a downwardly directed funnel 3, the bottom end thereof ending in a separation chamber 4.

In the embodiment shown, the separation chamber is defined by a cylinder mantle 5 perforated over the major part of the longitudinal extent thereof. The perforation holes may e.g. have a diameter of 3 mm; such a dimension being found suitable for a satisfactory straining-off of wet manure.

The partly perforated cylinder mantle 5 is, within the perforated area thereof, surrounded by a concentrical non-perforated cylinder mantle 6 which, at the bottom portion thereof, is provided with a discharge socket 7 for wet manure. The discharge socket 7 may, as known per se, be coupled to a pipe line or hose 8 leading to a storage room, not shown, e.g. a basin for liquid manure.

Within the separation chamber 4, there has been arranged a feeding means for manure supplied via the funnel 3. In the embodiment shown, the feeding means has the form of a screw conveyor concentrical with the cylinder mantles 5 and 6, the thread thereof being denoted 9'. Such a helical feeding means will contribute in pressing manure liquid, more or less radially, out of the manure mass set in motion, so that the manure mass screwed forwardly, successively becomes drier and drier as the same is being moved forwardly in the feeding direction.

However, it has been found that the hitherto described separation is not sufficient in order to obtain an optimal dewatering of the manure, i.e. to achieve a dry manure having a dry substance content in the order of 30–40 percent of weight.

Therefore, in accordance with the invention, there has been established, at a certain location of the feeding path of the partly separated manure, a manure plug forming zone 10 extending over a certain longitudinal section of said feeding path.

According to the preferred embodiment, this plug-forming zone is established through removing the screw thread 9' over said longitudinal section. In accordance with the figure, a thread portion approximately corresponding to 360 degrees has been removed. However, over said longitudinal section, the shaft 9 of the screw conveyor is intact.

When the successively fed dewatered manure arrives at the plug-forming zone 10, where due to lack of feeding means there no longer takes place a direct feeding of that end portion of the manure mass being the foremost at any time, the more or less dewatered manure mass starts to build up into a plug, which thereafter continuously forms a barrier creating a sufficient counter pressure in order to effect pressing out of the liquid manure upstreams of the plug through the perforations of the cylinder mantle 5. Thus, the plugforming effects a forced dewatering of the manure.

When the manure separator is in use, the relatively loose and resilient mass within the downstream gable face of the manure plug has to be removed continuously, simultaneously as the plug continuously is added new manure mass at the opposite gable face.

Suitably, this may be made by means of a corresponding screw conveyor thread 9" formed on the shaft 9 immediately downstream of the plug-forming zone 10, and which scrapes loose dry manure mass and conveys it further in the original direction of advance.

In the embodiment shown, the screw conveyor thread 9" feeds dewatered manure mass 11 down into an underlying chamber 12, wherefrom the manure mass is fed into a pipe 13 by means of a conveyor screw 14. The pipe 13 is situated above a storage for dry manure, e.g. a manure cellar 15, and has outlet sockets 16 for controlled discharge of dry manure.

In the examplary embodiment shown, the screw conveyor 9,9',9" of the separation device is driven by a motor 17 and the conveyor screw 14 by another smaller motor 18. However, there is nothing to prevent lengthening the screw conveyor 9,9',9" and the cylinder mantle 5 as indicated in dotted lines 5', inwardly above the manure cellar 15, and providing the non-perforated cylinder mantle extension 5' with dry manure discharge sockets corresponding to the sockets 16. Then, the need will be for one motor 17 only.

What is claimed is:

1. A device for the mechanical separation of wet natural manure masses into a wet phase and a dry phase, said device comprising:
   a substantially horizontal cylindrical sleeve having an upstream end longitudinally spaced from a downstream end, means for receiving masses of natural manure at said upstream end of said sleeve, said sleeve having a cylindrical strainer portion intermediate said ends of said sleeve through which the wet phase of the manure masses is discharged;
   a jacket surrounding said strainer portion of said sleeve for receiving the wet phase of the manure masses, said jacket having at least one outlet for the wet phase of the manure masses;
   a rotatable screw conveyor arranged concentrically within said sleeve, said screw conveyor comprising a central, driven rotary shaft carrying a first longitudinally extending screw thread section having an upstream end and a downstream end, said upstream end of said first screw thread section being proximate to said upstream end of said sleeve, said first screw thread section extending along a portion of said strainer portion of said sleeve so that said downstream end of said screw thread section is positioned in said sleeve at a location that is longitudinally spaced in the upstream direction from said downstream end of said sleeve, said first screw thread section moving manure masses longitudinally through said sleeve from said upstream end of said sleeve toward said downstream end of said sleeve, said rotary shaft carrying a second longitudinally extending screw thread section positioned within said strainer portion and having an upstream end and a downstream end, said downstream end of said first screw thread section being longitudinally separated from said upstream end of said second screw thread section along said rotary shaft to form a longitudinal space along said shaft intermediate said downstream end of said first screw thread section and said upstream end of said second screw thread section, said longitudinal space forming a corresponding longitudinal, annular zone within said sleeve which is free of obstruction around the entire circumference of said shaft, said longitudinal, annular zone being located upstream of said downstream end of said sleeve and establishing a zone within said sleeve in which a plug of relatively dry manure is continuously formed from the manure masses moved by said first screw thread section, said plug comprising a barrier in said sleeve exerting pressure on said manure masses moved through said sleeve by said first screw thread section for assisting in removing the wet phase from the manure masses upstream of said plug for discharge into said jacket, said second screw thread section removing manure in its dry phase from a downstream end of said manure plug for discharge from said downstream end of said sleeve; and
   driving means for rotating said screw conveyor.

2. The device according to claim 1 wherein said downstream end of said second longitudinally extending screw thread section is positioned upstream of said downstream end of said sleeve.

3. The device according to claim 2 wherein said device is coupled to a conveyor for supplying manure masses from domestic animals to said upstream end of said sleeve.

4. The device according to claim 1 wherein said device is coupled to a conveyor for supplying manure masses from domestic animals to said upstream end of said sleeve.

* * * * *